(12) United States Patent
Lindbo et al.

(10) Patent No.: US 7,739,400 B2
(45) Date of Patent: *Jun. 15, 2010

(54) INTERNET COMMUNICATION SYSTEM

(75) Inventors: Sverker Lindbo, Täby (SE); Peter Löthberg, Stockholm (SE); Paul Vixie, Woodside, CA (US)

(73) Assignee: Mirror Image Internet, Inc., Tewksbury, MA (US)

( * ) Notice: Subject to any disclaimer, the term of this patent is extended or adjusted under 35 U.S.C. 154(b) by 1017 days.

This patent is subject to a terminal disclaimer.

(21) Appl. No.: 10/408,491

(22) Filed: Apr. 7, 2003

(65) Prior Publication Data

US 2004/0068576 A1    Apr. 8, 2004

Related U.S. Application Data

(63) Continuation of application No. 09/284,353, filed on Jun. 30, 1999, now Pat. No. 6,581,090.

(51) Int. Cl.
G06F 15/173    (2006.01)

(52) U.S. Cl. .................... 709/238; 709/245

(58) Field of Classification Search ............ None
See application file for complete search history.

(56) References Cited

U.S. PATENT DOCUMENTS

| | | | |
|---|---|---|---|
| 4,851,988 A | | 7/1989 | Trottier et al. |
| 5,341,477 A | | 8/1994 | Pitkin et al. |
| 5,418,844 A | * | 5/1995 | Morrisey et al. ....... 379/221.09 |
| 5,459,837 A | | 10/1995 | Caccavale |
| 5,511,208 A | | 4/1996 | Boyles et al. |
| 5,649,103 A | | 7/1997 | Datta et al. |
| 5,787,470 A | | 7/1998 | DeSimone et al. |
| 5,828,847 A | * | 10/1998 | Gehr et al. .................. 709/239 |
| 5,835,583 A | | 11/1998 | Hetz et al. |
| 5,873,100 A | | 2/1999 | Adams et al. |
| 5,881,234 A | * | 3/1999 | Schwob ....................... 709/219 |
| 5,894,554 A | * | 4/1999 | Lowery et al. .............. 709/203 |

(Continued)

FOREIGN PATENT DOCUMENTS

EP    0 618 708 A2    10/1994

(Continued)

OTHER PUBLICATIONS

Meeting on Web Efficiency and Robustness, Cambridge, Massachusetts, USA, Workshop organized by World Wide Web Consortium, and hosted by Digital Equipment Corporation's Cambridge Research Laboratory, Apr. 1996.

(Continued)

*Primary Examiner*—Salad Abdullahi
(74) *Attorney, Agent, or Firm*—McCarter & English, LLP

(57)    ABSTRACT

The present invention relates to the transferring of information on the Internet, comprising: means (40) for storing information, corresponding to information provided at an Internet content provider (60), at respective alternative addresses of said storing means; means (20) for intercepting an information request from an Internet user directed to an Internet content provider; means for determining whether or not the intercepted request is directed to an information content provider having an associated alternative address on said storing means (40); and means for directing the request to said alternative address if such an alternate address exists.

17 Claims, 4 Drawing Sheets

U.S. PATENT DOCUMENTS

| | | | | |
|---|---|---|---|---|
| 5,913,904 | A * | 6/1999 | Meyer et al. | 68/5 C |
| 5,918,013 | A * | 6/1999 | Mighdoll et al. | 709/217 |
| 5,935,207 | A * | 8/1999 | Logue et al. | 709/219 |
| 5,991,306 | A | 11/1999 | Burns et al. | |
| 5,991,809 | A | 11/1999 | Kriegsman | |
| 6,003,030 | A | 12/1999 | Kenner et al. | |
| 6,006,018 | A * | 12/1999 | Burnett et al. | 709/219 |
| 6,006,264 | A | 12/1999 | Colby et al. | |
| 6,012,085 | A | 1/2000 | Yohe et al. | |
| 6,014,686 | A * | 1/2000 | Elnozahy et al. | 709/202 |
| 6,014,698 | A | 1/2000 | Griffiths | |
| 6,061,349 | A * | 5/2000 | Coile et al. | 370/389 |
| 6,115,741 | A * | 9/2000 | Domenikos et al. | 709/217 |
| 6,134,583 | A * | 10/2000 | Herriot | 709/217 |
| 6,298,373 | B1 * | 10/2001 | Burns et al. | 709/203 |
| 6,415,335 | B1 * | 7/2002 | Lowery et al. | 710/5 |
| 6,859,833 | B2 * | 2/2005 | Kirsch et al. | 709/224 |

FOREIGN PATENT DOCUMENTS

| | | |
|---|---|---|
| EP | 0 674 263 A1 | 9/1995 |
| JP | 08241260 A | 9/1996 |
| JP | 08278934 A | 10/1996 |

OTHER PUBLICATIONS

W3C Meeting on "Web Efficiency and Robustness," A Trip Report and Some Reflections, Harald Skardal, FTP Software Inc., Apr. 22, 1996.

HTTP-NG Problem Statement, "General Web Transport Problem Statement," Oct. 4, 1995.

Propagation, Replication and Caching, Jun. 4, 1996.

Propagation: Problem statement, Mar. 15, 1995.

"The UK World-Wide Web Proxy Cache: Introductory FAQ," (undated).

A. Pam, Xanadu, Australia, "Where World Wide Web Went Wrong," Mar. 19, 1996.

Bart Ziegler, "Slow Crawl on the Internet," Web Crunch, *The Wall Street Journal*, Sep. 6, 1996.

Nordling, Elias "Mirror image bygger om nätet," *Datateknik*, vol., No. 8, Apr. 24, 1997.

Oguchi et al, "A Study of Caching Proxy Mechanisms Realized on Wide Area Distributed Networks", IEEE, pp. 443-449, Aug. 6-9, 1996.

Japanese Abstract for Patent 08241260 A.

Japanese Abstract for Patent 08278934 A.

* cited by examiner

INTERNET COMMUNICATION SYSTEM

CROSS-REFERENCE TO RELATED APPLICATION

This application claims priority to and is a continuation of U.S. patent application Ser. No. 09/284,353, filed Jun. 30, 1999 now U.S. Pat. No. 6,581,090.

TECHNICAL FIELD OF THE INVENTION

The present invention relates to a method and a system for transferring information on the Internet.

BACKGROUND TO THE INVENTION AND PRIOR ART

Over the last few years, Internet has developed into the fastest growing means of communication and is predicted to be the main system for distributing information in the future. The Internet has become increasingly popular and the number of users is growing at a magnificent rate.

However, the popularity of the Internet, and especially the use of the Internet application World Wide Web, is putting the net under enormous capacity pressure. Traffic on the Internet doubles about every three months, with no signs of slowing down. This kind of exponential growth will eventually slow down, but several factors indicate that it is still far from any slowdown in growth.

Today, only a small fraction, about 3 to 5 percent, of all PCs have access to the Internet. It is believed that most of those who have made and will make the investment in a PC will eventually want access to the Internet. Furthermore, communication speeds between the user and the Internet infrastructure is increasing rapidly. The transition from 14.4 kbit/s modems to 28.8 kbit/s is just being completed as manufactures announce new modems at 56 kbit/s. Other technologies such as ISDN (128 kbit/s), Cable TV modems (500-10,000 kbit/s) and xDSL (2,000 to 25,000 kbit/s) are emerging. Moreover, manufacturers of household electronics are launching low costs devices to give Internet World Wide Web access through television sets, telephones, etc.

These and other factors are all contributing in making it increasingly difficult to access information on the Internet, since the system is basically being overloaded. This problem is a fact both in USA and Europe, but it is even more serious when passing information between USA and Europe. The transatlantic transmission capacity is too small to cope with the exploding Internet use.

Basically, there exists two conventional solutions to this problem. A first solution is to add more bandwidth and switching capacity, which is being done, but which carries huge costs and also faces significant technical problems. A second solution is to use so called "caching" or "mirroring" techniques. The meaning of these definitions is somewhat undefined and is also in some cases somewhat overlapping. However, "caching" basically means to keep track of the Internet traffic and to keep copies of the most frequently accessed World Wide Web files at a location closer to the user. Similarly, "mirroring" basically means to keep copies of specific World Wide Web files in a mirror server, independent of the access frequencies.

These second solutions hence involve the providing of a local copy of a World Wide Web Site of interest. For example, a copy of CNN's USA-based homepage may be provided in a cache or a mirror at a European "proxy" location, whereby European Internet users may access the CNN homepage without having to use the transatlantic communication link, thereby both attaining quicker access and at the same time lowering the load on the transatlantic link.

However, caching and mirroring also raises several technical problems. For example, current research show that to be most efficient, the cache must be near the original information source. Caching is always more efficient closer to the information content provider server then closer to the user. The problem is that, depending on the popularity of each site, the actual location of the most popular original information providers keep moving around. A cache would therefore need to be very big to be efficient.

Another problem is that the user must specify a location for the copies of the original content information, it being a cache or a mirror. Such a location is called a "proxy" and can be specified in all commonly used softwares for web access. This user interaction is difficult to obtain, given the increasing diversity of web users.

Furthermore, if the proxy is very large, as is needed to provide for a large amount of content with ever changing popularity, it will also, for economical reasons, need to cater for very many users. The proxy itself will then become a bottleneck, and access times may thus increase. Consequently, there exists a problem with the limited scaleability of the proxy technique.

SUMMARY OF THE INVENTION

It is therefore an object of the invention to reduce the capacity constraints on the Internet.

Another object of the invention is to provide a scaleable technology for reducing access time on the Internet which allows growth to a significantly larger amount of users and information traffic on the Internet.

According to the present invention, said objectives are achieved by a method and a system according to the appended claims.

Hence, according the invention, there is provided a concept for transferring information on the Internet, comprising: intercepting an information request from an Internet user directed to an Internet information content provider address; determining whether or not said request relates to an information content provider address providing information which is also provided at a corresponding alternative address; and directing said request either to said alternative address, if existing, or to said information content provider address, if not, for providing the requested information to said user.

The invention is hence based on the use of a so called interceptor, or interceptor means, which is used to examine the information requests from a user to decide whether the same information exists in a copied form or the like on a server means arranged locally with respect to said interceptor means.

Hence, information corresponding to at least part of the information provided at one or more Internet information content provider addresses, is provided at respective associated alternative addresses, preferably in a local storing means such as a local cache or mirror, the arrangement of said alternative addresses providing easier access with respect to a Internet user;

Here, the term "locally" does not necessarily imply locally in the geographical sense, but may just as well mean locally in a time or access sense. The essential feature being that the access to the "local" server is quicker, easier, more cost efficient, or in any other aspect more preferable then the access to the original content provider.

Consequently, in a preferred embodiment of the invention, said storing means is arranged in direct communication with said intercepting means.

According to the invention, the user does not have to decide whether it is preferable to use the alternative server or not. Instead this selection is performed by the interceptor, thereby essentially only making use of the local server when the requested information is actually provided thereon.

In order for the re-routing of the information requests to be effective, it is preferred that the interception means is arranged close to the user, preferably between said user and an Internet first switching point. Such an Internet first switching point is generally provided by a so called Internet Service Provider, which for example may be the local phone company, such as Telia in Sweden. However, in different applications, it will also or alternatively be preferred to arrange said intercepting means at a Border Router or at a so called Network Access Point.

According to yet another preferred embodiment of the invention, the interceptor comprises a look up table which includes a first list of information content provider addresses having associated corresponding alternative addresses, making it possible easily to determine whether or not the request relates to information possibly stored at an alternative address on said storing means. The first list may for example include a list of locally stored World Wide Web Sites, i.e. a list of IP-addresses.

The interceptor is hence arranged to receive the information request from the user and then to decide, by comparison with said list, whether the address of interest have a copy or the like thereof provided on the locally arranged server. If the answer is yes, the request is re-routed to an alternative address on the local server. If no, then the request is sent on "untouched" to the first switching point or directly to the Internet and so forth.

According to a preferred embodiment of the invention, only requests or frames referring to a specific communication format or application, corresponding to the type of information service provided on the local storing means, is intercepted. For example, only so called TCP-queries to the WWW port.

According to the invention, the user does not have to decide whether or not to use an alternative address. Instead, the interceptor keeps track of which addresses or information that are stored in a copied form at the local server and simply re-routs the request if there is a match between the requested information address and a locally arranged copy of at least part of the information held at the requested address.

This allows for the preferred scalability of a system according to the invention, since the local server may be very large without slowing down the use of the server. The information request does not have to pass through the local server, but merely be judged with respect to the list of addresses stored in the interceptor. A interceptor according to the invention may therefor be used in communication with several servers, which in turn may be arranged in an hierarchical memory structure.

Furthermore, the said interceptor means may be constituted by several interceptors arranged in parallel and connected, preferably via high speed switching means, to the server or servers.

In order for the request to be easily directed to the correct location on the server or servers, in such a case when at least one alternative address exists, said look up table preferably further comprises a second list of corresponding alternative addresses being associated with said information content provider addresses, for obtaining an alternative address corresponding to the request. When the interceptor decides that a copy of at least part of the information provided at the requested information address exists on one of the local servers, the second list provides the exact location of said alternative address or information on the server, thereby allowing the request to be re-routed directly to the alternative address, without having to travel through the entire server in order to reach the address of interest. This feature further increases the scalability of a system according to the invention.

In some cases, it may be desired to provide copies of only part of the information content provided by an information content provider. In such a case, it is preferred to pass the information request along to the original content provider if the request corresponds to the part of the entire information content which in fact does not exists on the local server.

Hence, according to a preferred embodiment of the invention, there is provided a list storing information indicating if all of the information at the respective information content provider addresses is provided at the associated corresponding alternative addresses or, if not, which part of said information is provided, or is not provided, at said at least one associated corresponding alternative addresses. Consequently, the interceptor according to this embodiment is arranged to direct said information request to an applicable alternative address on the local server only if said alternative address provides the part of the information which refers to said information request.

According to a further developed embodiment, this third list, or parts thereof, may be provided in connection with the local server. According to this embodiment, a request relating to a specific content address, having an alternative address on said server, may be re-routed to the server even if the part of information of interest in fact does not exist in a copied form on the server. However, when received at the server, the request is checked against said third list and then, since the relevant information in this case actually did not exist, is sent on to the original content provider. Consequently, some requests may be temporarily re-routed but still sent on to the original content provider. In a preferred embodiment, the part of said third list relating to frequently visited sites is stored in connection with said interceptor means, and the part relating to less frequently visited sites is stored in connection with said storing means. This provides the advantage of faster processing achievable by said interceptor and determining means.

The third list may for example include so called URL-addresses or addresspatterns of files or object that are or are not mirrored at the alternative address.

According to yet another embodiment of the invention, there is provided means for updating the information at said alternative addresses. Preferably, said updating means is arranged to update the information at said alternative addresses at specific time intervals. Alternatively, said updating means may be arranged to provide an updating signal from said information content provider address to said corresponding alternative address for updating the information at the alternative address when requested.

According to a yet further embodiment of the invention, said local server may comprise processing means for controlling for example said updating of the information at the alternative addresses. The server control unit or a interceptor control unit may be used to update said lists as the information content in the local storing means changes.

The invention provides many advantages compared to prior art. For example, traffic can be redirected to the mirror server even if the user do not specify a proxy location or if the user deliberately tries to inactivate a proxy setting made by the Internet Service Provider.

The content on the local or mirror server can be managed through a process known as "server push", whereby changes in the original content servers is "pushed" to the mirror server.

Further, there is no limit to the number of interceptors that may be used. Moreover, each interceptor may point to any number of different servers for different parts of the mirrored content. Also, several mirror servers may be configures both in parallel at a given location, and in a geographic hierarchy.

In the event of a failure of an interceptor, it can rapidly be bypassed to restore some service while the interceptor is being repaired or replaced.

In the event of a failure of a mirror server, or a disk subsystem or on a mirror server, the interceptor can be instructed to route the affected part of the traffic to the Internet, while the defective components are being repaired or replaced.

It is to be understood that the local storing means may function as a mirror as well as a cache, as long as an updated list of which sites that presently are stored on said storing means exists to be used by the interceptor for deciding whether or not to re-route the request.

Although the description of the invention has been made with respect to the Internet communication system, it is understood by those skilled in the art that the invention also may be used in other similar types of global information communication systems which may be found in the future and which may show similar kinds of communication problems. The invention is therefore of course not limited to the Internet application.

Also, even though the description further has been made mainly with respect to the World Wide Web application, it is to be understood that the invention may as well be used for many other kinds of net applications and is not limited thereto.

Furthermore, even though the invention has been described as comprising intercepting, determining, directing and other means, it is understood by those skilled in the art that these different elements do not necessarily need to be provided as single units, but may instead constitute part of each other or may be integrated in some form.

BRIEF DESCRIPTION OF THE DRAWINGS

Further aspects, features and advantages of the invention will become clear from the following description of preferred exemplifying embodiments with reference to the accompanying drawings, in which.

DETAILED DESCRIPTION OF THE PREFERRED EMBODIMENTS

Figure 1:
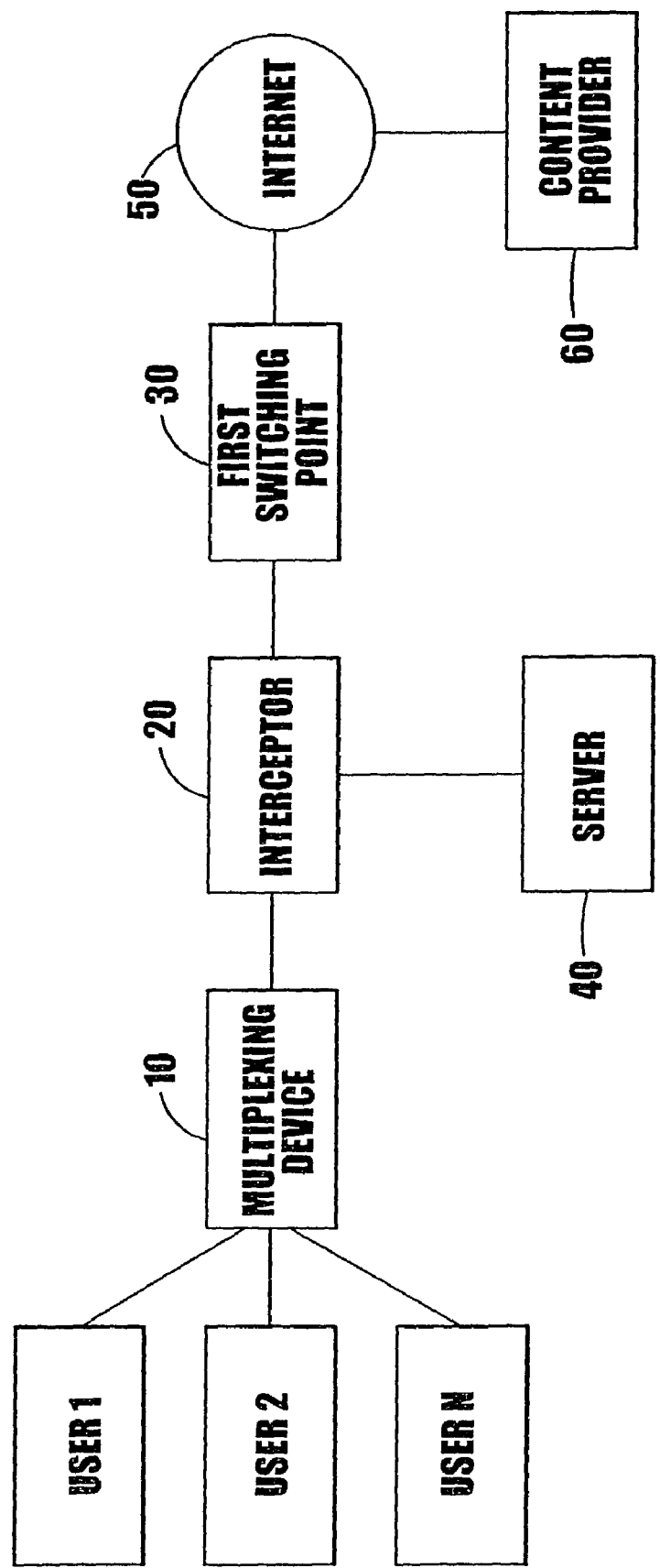
FIG. 1 schematically shows a block diagram of a first embodiment of a system according to the present invention.

With reference to FIG. 1, a first embodiment of a system for communicating information on the Internet will now be described.

In FIG. 1, a set of end user terminals or stations USR1 to USRN are connected to a multiplexing unit 10, which may be a modem pool or a LAN router depending on the type of user system. The multiplexing unit 10 is connected to an interceptor 20 which, in turn, is connected to an Internet first switching point 30 providing access to the Internet 50, said first switching point 30 generally being located at the premises of an Internet Service Provider. The multiplexing unit 10 multiplexes the communications to and from the user terminals USR1 to USRN.

According to this system, a user USR1 wishing to access information provided for example as a World Wide Web homepage or site by an Internet information content provider 60, located at a original site of publication somewhere on the Internet 50, generally sends an information request, specifically a HTTP request to the WWW-port, via the multiplexing unit 10 to the Internet first switching point 30, where the request is routed out on the Internet 50 to finally reach the content provider 60. The content provider 60 then answers the request, sending the requested information via the Internet 50 back to the user USR1.

However, according to the first embodiment of the invention shown in FIG. 1, the information request from a user USR1 to USRN is intercepted by the interceptor 20 before it reaches the first switching point 30. The information request is then examined by the interceptor, which decides whether or not the requested information, for example the information provided by the content provider 60, exist in a copy or similar form on a local server 40, often called a "mirror server", arranged in direct communication with the interceptor 20. If a copy or the like of the requested information provided by the content provider 60 is stored at the local server 40, the request from the user is re-routed to the server 40, which will then return the requested information to the user. However, if the interceptor determines that no copy or the like of the information of interest exists on the local server 40, then the information request from the user USR1 to USRN is sent on to the Internet first switching point as in the conventional form of Internet communication.

Note that the interceptor 20 only intercepts communication packages of certain specific types. For example, in FIG. 1, only World Wide Web information requests from the users USR1 to USRN is intercepted. Other types of communication services, such as e-mail or the like, is left undisturbed by the interceptor 20.

If a request is re-routed to the server 40, but the server 40 however is unable, perhaps temporarily, to answer the request due to some kind of failure or the like, or for example if the server only provides a copy of part of the information stored at the original content provider address, said request referring to the "uncopied" part, the server is then arranged to pass on the request to the original content provider via the Internet 50 unaffected, thereby making sure that the user will get the information requested also in these types of situations. Also, the interceptor 20 is arranged so that the communication between the users USR1 to USRN and the first switching point 30 bypasses the interceptor 20 in cases when the interceptor suffers from a failure, in order for the general communication to be left undisturbed in such cases.

The system is arranged to update the information provided by the mirror server 40. This can be performed in many ways, as is understood by those skilled in the art. In one example, the interceptor 20 or the mirror server 40 is arranged to update the server 40 at specific time intervals, for example once a day. As is clear, different bases stored on the mirror server 40 may need to be updated at different time intervals, depending on the rate that the information provided at the original content providers 60 is altered.

According to another example, the content provider 60 may be provided with a specific updating service unit (not shown) which is arranged to send an updating signal to the mirror server 40 when the information provided by the original content provider 60 has been changed significantly, said change causing the service unit to decide that the mirror server need to be updated and hence send the updating signal, in respond to which the mirror server 40 is updated or performs an updating procedure.

Figure 2:
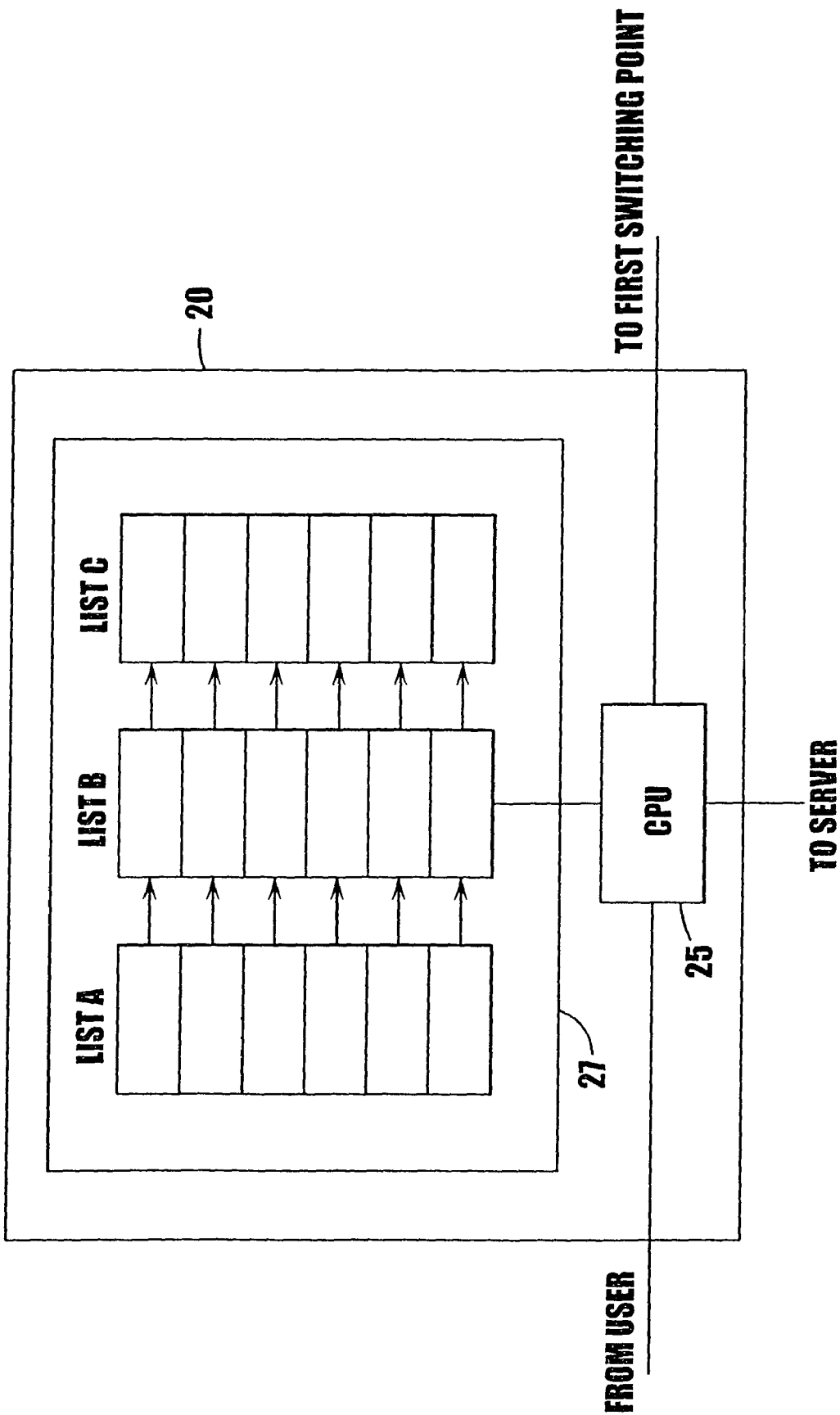
FIG. 2 schematically shows a block diagram of en embodiment of the interceptor in FIG. 1.

An exemplifying embodiment of the interceptor 20 shown in FIG. 1 will now be described with reference to FIG. 2. In FIG. 2, the interceptor 20 comprises a central processing or control unit 25 which generally receives information packages from the user or users and sends on information packages to the first switching point in FIG. 1. The interceptor 20 further comprises a memory 27 which stores a look up table comprising three lists A, B and C. The central processing unit 25 is hence also connected to the memory 27 and to the mirror server 40 in FIG. 2.

The look up table in the form of the three lists A, B and C stored in the memory 27 provides information regarding which information that is to be found at which locations on the mirror server 40. More specifically, list A provides information as to which Internet content providers (for example content provider 60 in FIG. 1) are to be found in a copied or similar "mirrored" alternative form on the mirror server 40, for example a set of the most frequented IP-addresses. Further, list B provides information as to at which specific locations or addresses the respective mirrored sites is to be found on the mirror server 40. Finally, list C provides information as to which part or parts of the full content of the information provided by the different original content providers 60 that are, or are not, provided at the mirrored sites on the mirror server 40, for example a list of URL-patterns of files on these sites that for one reason or other is not mirrored.

As is indicated by the arrows in FIG. 2, each field in the respective lists is associated with a specific field in the other lists. For example, each IP-address in list A, referring to an original content provider 60, is associated to an associated specific mirror or alternative address on the mirror server 40 in list B and to a specific field of URL-patterns in list C that are not mirrored at the mirror site.

An example of the operation of the interceptor 20 in FIGS. 1 and 2 will now be described. When the central processing unit 25 in the interceptor 20 receives or intercepts a message from a user, say USR1, it firstly checks if the message is of a type of interest, i.e. if the message relates to the kind of information type stored on the mirror server 40, for example if the message is a IP World Wide Web request. If the message is not of the relevant type, for example if its a e-mail message, it is sent on directly to the first switching point 30 without being affected by the interceptor 20.

However, if the message is of a relevant type, i.e. an IP WWW request, the central processing unit 25 accesses list A to determine whether or not the requested IP-address exist in list A, i.e. whether or not the requested IP-address exists in a mirrored form on the mirror server 40. If the answer is no, i.e. if the request IP-address does not exist in list A, the request is sent on to the Internet first switching point 30. In such a case, the request is consequently left unaffected by the interceptor.

However, if the answer is yes, i.e. if the request IP-address exists in list A, the central processing unit 25 accesses the associated field in list C to determine whether or not the entire content provider site is mirrored on the mirror server or, if not, whether or not the requested information relates to the part or parts of the content provider information which do exist in a mirrored form on the mirror server 40.

Then, if the requested information relates to a part of the original content provider information which is determined not to exist on the mirror server 40, the central processing unit sends the request to the Internet first switching point 30 unaffected by the interceptor 20.

However, if the relevant information is determined to exist on the local mirror server 40, the central processing unit 25 accesses the associated field in list B in the memory 27 to derive information as to the specific location address of said information on the mirror server 40. The central processing unit 25 then sends the information request directly to this location address on the mirror server 40, which in respond to said request provides the requested information back to the user USR1 via the central processing unit 25.

As is understood by those skilled in the art, the structure and operation of the central processing unit 25 and the look up table in the memory 27 may be realized in many different ways, the invention not being limited to the one described herein. For example, parts of said list C may be provided at the mirror server (not shown), whereby a request relating to an address included in the list A is re-routed to the server independent of whether or not the requested part of the mirrored information actually exists on the server. If, in fact, it doesn't, the server then simply sends the request along to the original content provider.

Figure 3:
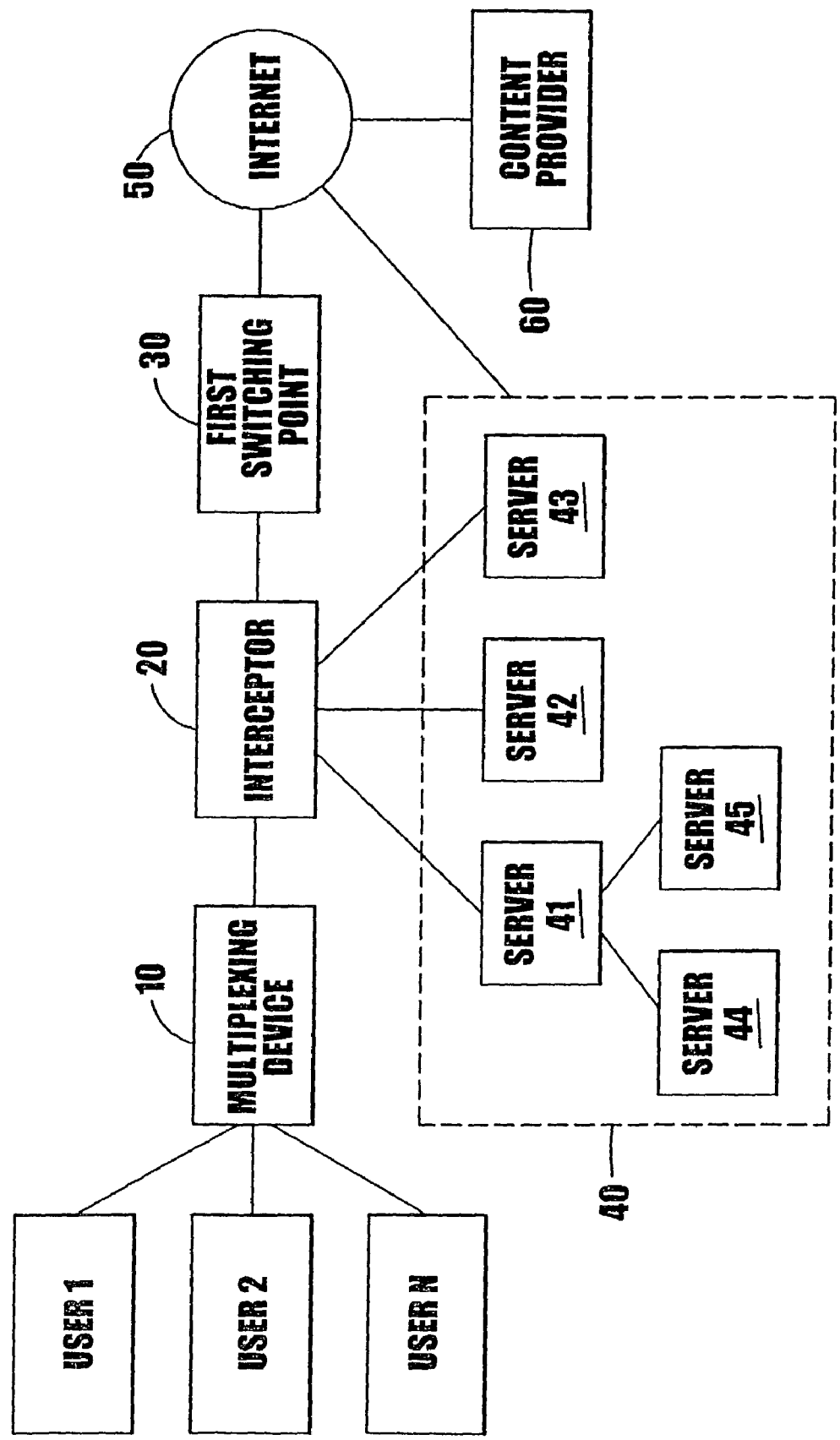
FIG. 3 schematically shows a block diagram of a second embodiment of a system according to the present invention.
Figure 4:
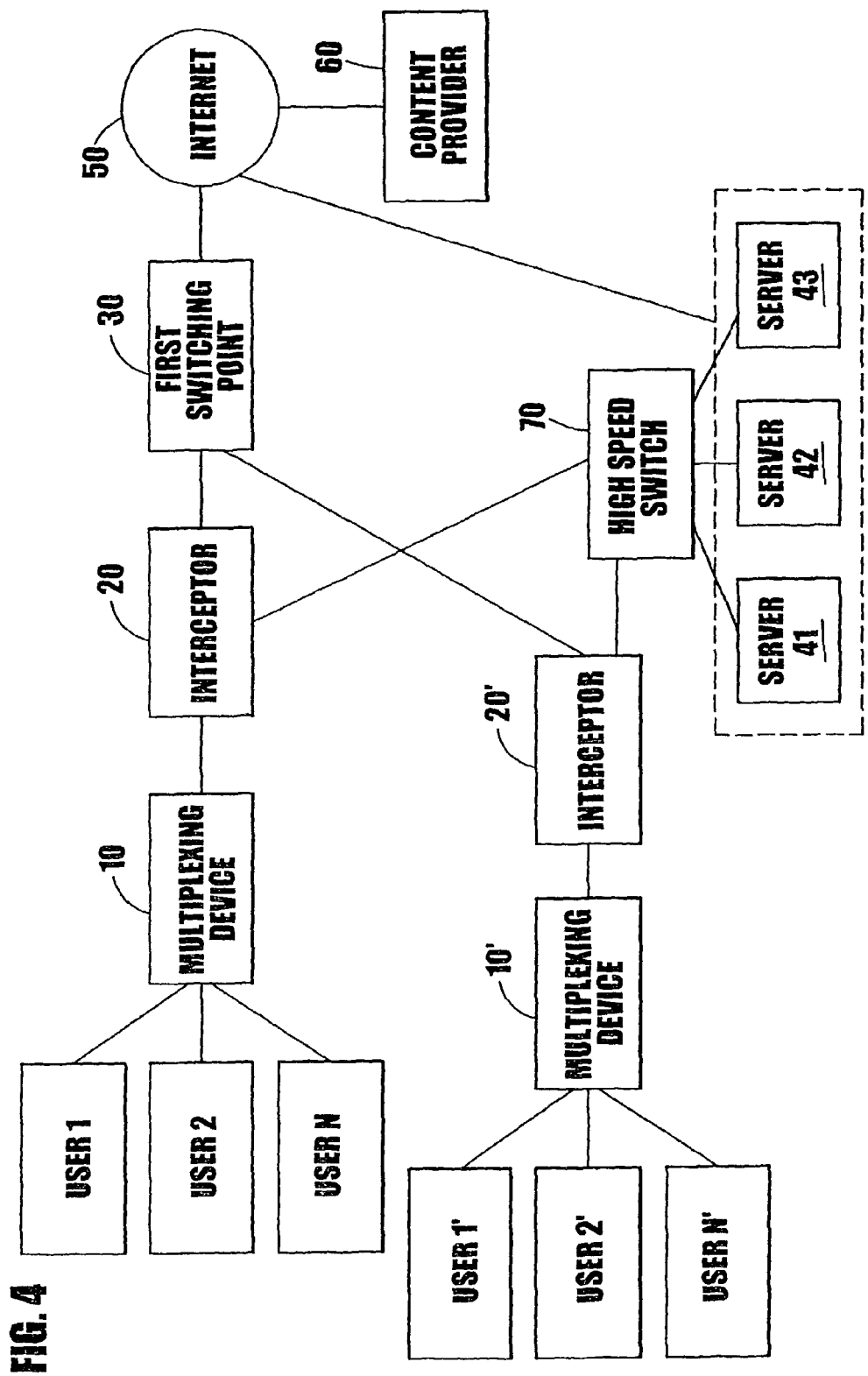
FIG. 4 schematically shows a block diagram of a third embodiment of a system according to the present invention.

In FIGS. 3 and 4, for ease of description, elements corresponding to those already described with reference to FIGS. 1 and 2 will be designated with the same numerals, and description thereof is therefore omitted in the following.

In FIG. 3, another embodiment of a system according to the invention is shown, wherein the storing means 40 is comprised of a set of mirror servers 41-45 arranged in a hierarchic structure, instead of using a single server as shown in FIG. 1. If so desired, the separate mirror servers 41-45 may be arranged at different geographical or logical locations, thereby providing scaling and configuration flexibility. According to this embodiment, said list B of the interception memory 27 in FIG. 2 is arranged to provide address information as to which server and which location thereon that is associated with the respective mirrored IP-addresses.

In FIG. 4 there is shown an embodiment of a system according to the invention, wherein two separate user groups, USR1, USR2, . . . , USRN and USR1', USR2', . . . , USRN', are serviced by separate interceptors 20 and 20', respectively, via multiplexing devices 10 and 10', respectively. The intercepting means is hence comprised of two (or more) identical interceptors 20, 20', each serving different user groups but making use of the same set of mirror servers 41-43. The respective interceptors 20, 20' communicates with the different mirror servers 41-43 via a high speed switch 70. In this embodiment, the interceptors 20 and 20' are both connected to the same Internet first switching point 30. However, the interceptors 20, 20' could just as well be connected to different Internet first switching points but still be using the same set of memory servers 41-43. According to this embodiment, an incoming request from a user is directed to the respective interceptor 20, 20' which re-routes, if so decided, the request to the relevant mirror server 41-43 via the high speed switch 70 or sends the request unaffected to the first switching point 30. The possibility to use several interceptors in the described manner further enhances the scalability of a system according to the invention.

It is understood that the construction and function of the separate elements described with reference to the drawings will become apparent for those skilled in the art.

Even though the invention has been described with reference to specific exemplifying embodiments, many different alterations, modifications and the like will become apparent for those skilled in the art. The described embodiments are therefore not intended to limit the scope of the invention, as defined by the appended claims.

The invention claimed is:

1. Method for transferring information on the Internet, comprising the steps of:
   intercepting an information request;
   determining whether the information request relates to a content provider address having a corresponding alternative address, the alternative address providing at least part of the information provided at the content provider address, wherein determining whether the information request has an corresponding alternative address is accomplished by comparing the content provider address to information located on a storage means directly connected to an interceptor; and
   directing an information request to one of the alternative address and the content provider address.

2. A method as recited in claim 1, further comprising the step of:
   updating information at the alternative address.

3. The method of claim 1 further comprising:
   providing a first list of information relating to content provider addresses having respective corresponding alternative addresses;
   accessing the first list of information content provider addresses having respective corresponding alternative addresses; and
   determining whether the request relates to a content provider address having a corresponding alternative address.

4. The method of claim 1 further comprising:
   providing a plurality of lists of information relating to content provider addresses having respective corresponding alternative addresses;
   accessing a plurality of lists of information relating to content provider addresses having respective corresponding alternative addresses; and
   determining whether the request relates to a content provider address having a corresponding alternative address.

5. A method for transferring information comprising the steps of:
   determining whether data entered and transmitted by an Internet user is an information request;
   intercepting an information request;
   determining whether the information request relates to a content provider address having a corresponding alternative address, the alternative address providing at least part of the information provided at the content provider address, wherein determining whether said information request has an corresponding alternative address is accomplished by comparing said content provider address to information located on a storage means directly connected to an interceptor; and
   directing an information request to one of said alternative address and said content provider address.

6. A method as recited in claim 5, further comprising the step of:
   updating information at said alternative address.

7. The method of claim 5 further comprising:
   providing a first list of information relating to content provider addresses having respective corresponding alternative addresses;
   accessing the first list of information content provider addresses having respective corresponding alternative addresses; and
   determining whether the request relates to a content provider address having a corresponding alternative address.

8. The method of claim 5 further comprising:
   providing a plurality of lists of information relating to content provider addresses having respective corresponding alternative addresses;
   accessing a plurality of lists of information relating to content provider addresses having respective corresponding alternative addresses; and
   determining whether the request relates to a content provider address having a corresponding alternative address.

9. A method for efficiently delivering cached information to users, comprising the steps of:
   intercepting an information request;
   determining the information request relates to a content provider address having a corresponding alternative address, the alternative address providing at least part of the information provided at the content provider address, wherein determining whether the information request has an corresponding alternative address is accomplished by comparing the content provider address to information located on a storage means directly connected to an interceptor;
   directing an information request to one of the alternative address and the content provider address; and
   providing the user requested information to the user from one of the alternative address and the content provider address.

10. A method as recited in claim 9, further comprising the step of:
    updating information at said alternative address.

11. The method of claim 9 further comprising:
    providing a first list of information relating to content provider addresses having respective corresponding alternative addresses;
    accessing the first list of information content provider addresses having respective corresponding alternative addresses, and
    determining whether the request relates to a content provider address having a corresponding alternative address.

12. The method of claim 9 further comprising:
    providing a plurality of lists of information relating to content provider addresses having respective corresponding alternative addresses;
    accessing a plurality of lists of information relating to content provider addresses having respective corresponding alternative addresses; and
    determining whether the request relates to a content provider address having a corresponding alternative address.

13. A method comprising the steps of:
    receiving a information request, wherein the information request includes information related to a content provider address;
    intercepting the received information request;
    determining whether the content provider address has a corresponding alternative address by comparing said content provider address to information located on a storage means directly connected to an interceptor, the corresponding alternative address also being located on a said storage means;

providing at least part of the information requested at the content provider address; and providing the information to the Internet user based upon the information request.

14. A system for efficiently delivering cached information to Internet users, the system comprising:

means for intercepting an information request;

means for determining whether or not said information request relates to a content provider address having a corresponding alternative address, said alternative address providing at least part of the information provided at said content provider address, wherein the means for determining whether said information request has an corresponding alternative address is accomplished by comparing said content provider address to information located on a storage means directly connected to an interceptor means; and means for directing an information request to one of said alternative address and said content provider address.

15. The system of claim 14, further comprising:

means for updating information at said alternative address.

16. The system of claim 14 further comprising:

means for providing a first list of information relating to content provider addresses having respective corresponding alternative addresses;

means for accessing the first list of information content provider addresses having respective corresponding alternative addresses; and means for determining whether the request relates to a content provider address having a corresponding alternative address.

17. The system of claim 14 further comprising:

means for providing a plurality of lists of information relating to content provider addresses having respective corresponding alternative addresses;

means for accessing a plurality of lists of information relating to content provider addresses having respective corresponding alternative addresses; and means for determining whether the request relates to a content provider address having a corresponding alternative address.

* * * * *